Aug. 11, 1942.    R. R. OLIN ET AL    2,292,396
PROCESS FOR CURING GOLF BALL COVERS AND OTHER MATERIALS
Filed Jan. 7, 1939

INVENTOR.
Robert R. Olin, Howard I. Cramer
BY and Willis E. Reichard.
THEIR ATTORNEY.

Patented Aug. 11, 1942

2,292,396

UNITED STATES PATENT OFFICE 2,292,396

PROCESS FOR CURING GOLF BALL COVERS AND OTHER MATERIALS

Robert R. Olin, Akron, Howard I. Cramer, Cuyahoga Falls, and Willis E. Reichard, Elyria, Ohio, assignors to The Worthington Ball Company, Elyria, Ohio, a corporation of Ohio Application January 7, 1939, Serial No. 249,780

16 Claims. (Cl. 18—53)

This invention relates to an improved method for curing balata, gutta percha, rubber, and materials of similar character, and relates more particularly to employing such method in the manufacture of golf balls.

It is an object of the present invention to provide a practical process for making golf ball covers of balata containing stock, whereby a more desirable cover at a lower cost is secured.

Another object of the invention is to provide an improved method of obtaining better dispersion of curing ingredients and accelerators in balata or golf ball cover stock.

Another object of the invention is to provide a process for producing an improved cover having uniformity of cure throughout the cover per se as well as between the covers of different balls.

A further object of the invention is to provide a process for producing covers having improved seams between half shells by eliminating bloom and "scorching" during the process.

Still another object is to eliminate the necessity of using conventional curing ingredients, such as free sulphur in the compound, to thereby avoid oxidation and brittleness of the covers even after prolonged ageing or usage.

Another object of our invention is to provide an improved method of curing an article of rubber-balata, or other compositions presenting similar problems in the curing thereof, and of substantial thickness as in the case of golf ball covers, in a highly efficient, economical manner, and whereby a superior product may be reliably produced in mass production.

Other objects of our invention and the invention itself will become increasingly apparent from the appended description and drawing, which relates to a preferred method of practicing the invention as applied to a particular application of the process, to-wit: To the curing of covers for golf balls.

Figure 1:
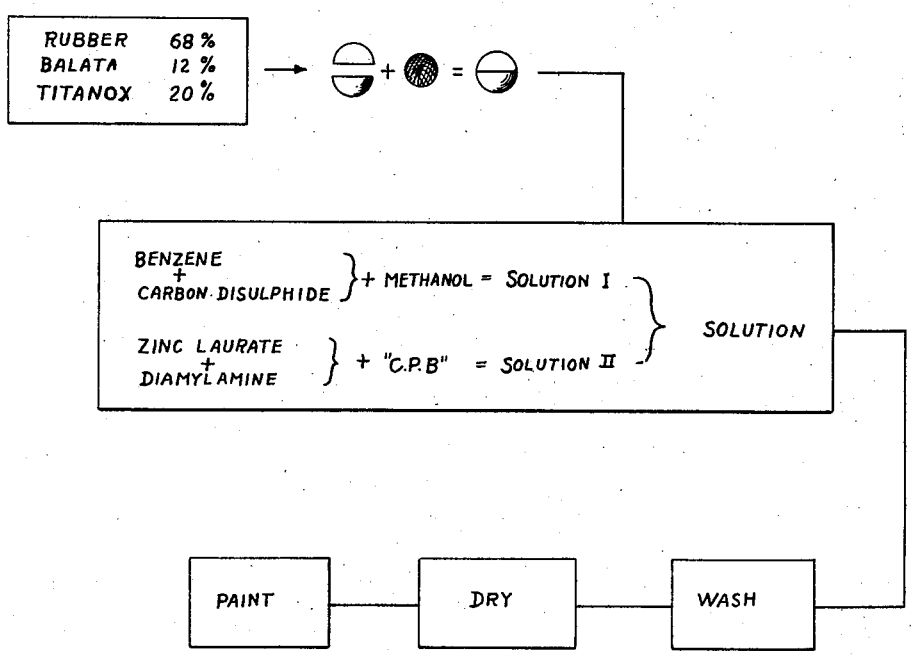
Fig. 1 is a view of a schematic plan of the order of operations employed in the improved process.
Figure 2:
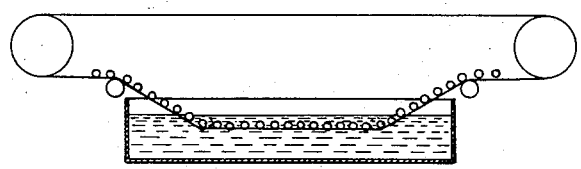
Fig. 2 is a diagrammatic schematic view of the step in the process involving the immersion of the completed golf ball in the curing solution.
Figure 3:
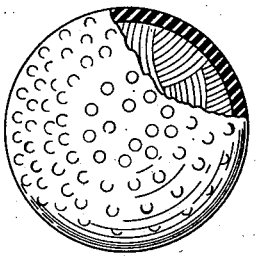
Fig. 3 is a lateral view of a complete golf ball a portion being cut away to expose the inner ball center.

In the following description, wherever reference is made to balata it will be understood that gutta percha, or any other material of a similar nature, is intended to be comprised within the meaning of the term, whether such material be a natural or a synthetic product.

In the practice of the present invention, a batch of cover stock is milled and applied to the ball core, and thereafter the cover is molded in a convenient manner and subsequently cured.

Preferably, a batch of cover stock is prepared by mixing together balata, rubber, and any suitable pigment, for example, "Titanox," which is the trade name for a mixture of titanium dioxide and barium sulphate.

The composition of the cover stock is preferably predominantly balata and, assuming that the stock contains 100 parts of balata and rubber, the mixture is approximately 65% to 85% balata, and the balance rubber, and inert pigment. The following composition has been found satisfactory:

|  | Parts by weight |
|---|---|
| Balata | 68 |
| Rubber | 12 |
| Titanox B | 20 |

The balata may be of any suitable type and grade, and, as previously stated, other similar materials may be substituted therefor; for example, gutta percha. Likewise, the crepe rubber may be para rubber, smoked sheet, and the like, or it may be entirely replaced by an additional amount of balata, or alternately all the balata may be replaced by natural or artificial rubber, or rubber derivatives. The titanium dioxide and barium sulphate mixture may be replaced by other barium or calcium base pigments as desired, but we have found that very desirable results are obtained from the use of a barium base pigment such as "Titanox B," which contains approximately 75% barium sulphate.

Although there is no danger of pre-curing during milling, due to the absence of curing agents and accelerators in the batch, as for example, free sulphur, zinc oxide, etc., it will be understood that excessive heat will break down the so-called texture, whereby it becomes soft and mushy. Accordingly, we prefer to hold the milling temperature so that it does not exceed 220° F. in order to satisfactorily compound the mixture without adversely affecting its quality.

After thoroughly compounding the material on the mill the mixture may be formed into slabs or sheets for storage, or if desired, ball half-covers may be molded or complete covers formed on the cores prior to being stored. It is considered preferable to hold the molding temperature to as low a temperature as possible while effecting molding in a short period of time.

Since no vulcanizing agent is present in this stock during the milling operation, the operation is accomplished in less time and as a result any danger of injuring the stock from overmilling is eliminated. Overflows from the mold can further be incorporated into a new batch without regard to the quantity used.

At any convenient time after molding, a solution is applied to the covered balls either by immersion of the balls therein, or otherwise, said solution containing ingredients which will penetrate the cover stock and cooperatively react with said cover stock whereby curing of the stock may be effectively accomplished. A specific example of a preferred curing solution is as follows:

| | Parts by volume |
|---|---|
| Benzene (benzol) | c. c. 25 |
| Carbon disulphide | c. c. 15 |
| Methanol | c. c. 60 |

| | Parts by weight |
|---|---|
| Zinc laurate | grams 1.8 |
| Dibutyl xanthic disulphide ("CPB") | do 5.75 |
| Diamylamine | do 3 |

In the foregoing solution, the accelerator, dibutyl xanthic disulphide, known to the trade as "CPB", may be replaced by other accelerators having generally similar functional or accelerophore grouping, such as xanthic or thiuram polysulfides, di isopropyl xanthic disulfide, dipentamethylene thiuram tetrasulfide, or the like; or any accelerator of vulcanization containing the following accelerophore grouping:

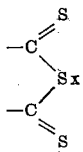

where $x$ may be 2 or more.

This main grouping, as is well known, may be divided into sub-groups:

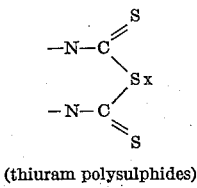

(thiuram polysulphides)

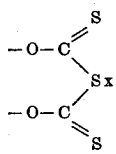

(xanthic polysulphides)

The above accelerators may generally be termed, simply, "polysulfides," herein.

Zinc laurate is the chemical salt due to the reaction of zinc hydroxide and lauric acid.

As is well known, carbon disulphide and methanol are vehicles or penetrants of rubber, balata, or the like; benzene and carbon disulphide being, moreover, solvents, and methanol being a non-solvent of rubber or like material.

Although the order of adding the different ingredients of the said solution to the other ingredients may be varied, preferably in preparing this solution the carbon-disulphide is poured into the benzene. The carbon-dissulphide and benzene mixture is then poured into the methanol.

The zinc laurate may be dissolved in the diamylamine or other high boiling point amine such as dibutyl amine, etc., in the proportions shown in the above example by preferably heating the solution while agitating it for approximately fifteen minutes at the temperature of boiling water.

Alternately, the zinc laurate may be dissolved in the diamylamine or other high boiling point amine, at lower temperatures, such as between 100° and 120° F., over a longer period, such as between 24 and 48 hours. This alternate method of mixing the compound substantially eliminates objection to fumes which may emanate from the diamylamine which are more noticeable when mixing these at the higher temperature previously referred to.

The zinc laurate and diamylamine mixture is then preferably cooled to room temperature, such as approximately 70° F., this cooled solution of zinc laurate and diamylamine then being added to the mixture of carbon disulphide, benzene, and methanol, and stirred. Finally, the accelerator, "CPB", is added to this mixture and stirred.

In the above, though we may have referred to the various ingredients as being put into solution, or certain of the ingredients dissolved in others, we are aware that to some extent at least chemical combinations are effected between certain of the ingredients, the precise nature of which has not as yet been finally completely determined, and we are, moreover, of the belief that successive or overlapping chemical reactions take place, certain of which being completed in a relatively short time and certain of which continue for a longer period.

The cover stock or ball covers which have been previously prepared as disclosed herein are then immersed in this solution maintained at a temperature of approximately from 65° to 70° F., for about a period of two hours, after which they are removed therefrom, being then, after drying, prepared for effective curing under the stimulus of elevated temperature.

While curing may then take place at room temperature or any desired elevated temperature, if given sufficient time, the curing may be accelerated by placing the stock or ball covers in an oven for 50 to 75 hours preferably maintained at a temperature between 95° to 105° F. Examination of the covers then by any of the usual methods will disclose that the cover composition or stock, due to the absorption of the curing material from the above solution, has become effectively cured. When the balls are thus cured they are subsequently washed, dried, and painted in the usual manner.

It is desirable that in the above solution the solvent and non-solvent vehicles, that is, benzene and alcohol, are thoroughly dried out or evaporated upon heating, while the accelerator and activator, which will not evaporate, are retained in the material or cover. It is important that the vehicles be completely evaporated after thorough penetration of the curing ingredients into the cover composition, and the proportions of solvent and non-solvents above set forth have proven satisfactory for this purpose in the curing of golf ball covers.

It will be noted that the above solution is characterized in that no free sulphur is added thereto as an ingredient thereof. However, if desired to increase the rapidity or degree of curing, sulphur preferably in the proportion of approximately 0.45 grams may first be dissolved in the carbon disulphide component of the above solution.

The method of treating balls or stock by the solution is the same in either case, however. The present invention contemplates, in a broader aspect, the like use of the solution with or without the introduction of free sulphur in the same.

It will be noted that the above process contemplates the use of zinc laurate as an introduced ingredient of the solution, and that no zinc, or zinc oxide, or other similar materials or compounds are added to the balata rubber mixture except by treatment of the solution. The proportions of zinc laurate, "CPB," and diamylamine, vary within large limits, and we find that for some purposes, reducing the proportions of these materials relative to the amount of vehicle in the solution achieves complete and rapid curing effects.

It is believed that the aliphatic amine diamylamine reacts with the carbon disulphide to form the diamyl ammonium salt of diamyldithiocarbamate and subsequent reaction produces the zinc salt of diamyldithiocarbamate.

The inclusion of zinc laurate in the above solution is of distinct advantage inasmuch as it eliminates the necessity of including zinc oxide, or other similar curing aid, in the balata and rubber compound, as for instance, set forth in the previously filed co-pending application of Reichard et al., Serial No. 223,688, filed August 8, 1938. Also, it is found that by including all of the vulcanizing agents, ingredients, solvents, non-solvents, and vehicles, in one solution, a more uniform dispersion, in predetermined proportional amounts throughout the compound, is accomplished than may be achieved in prior processes.

In practicing the process, as above described, the relative proportion of zinc laurate, dibutyl xanthic disulphide, and diamylamine may be considerably varied. Also, the curing may be effectively accomplished with reduced proportions of the above materials relative to the amount of the vehicle solution.

It will be understood that in the above solution, ingredients which are equivalent to those hereinabove set forth, for the purpose employed, may be used. With respect to zinc laurate employed for the purpose of increasing the activity of the organic accelerator employed, other activators such as those utilizing soluble organic salts of various metals may be substituted, as well as the organic metal salts such as sodium stearate, lead odeate, sodium laurate, etc.

It is to be understood that accelerator and activators other than those herein specifically mentioned may be used with equally good results and that other solvents and non-solvents, might be employed in the stead of those mentioned here. Further, that other amines might be utilized in place of diamylamine, and that the invention contemplates the use of equivalent materials for any of the ingredients, groups thereof, or reaction products thereof.

While we have described our invention above as used for the purpose of providing improved golf balls comprising covers which include as a principal constituent our improved composition of material as evolved by the above described process, we are aware that numerous other uses may be made of the improved composition material as above set forth, and it is understood that we do not wish to be limited to the use above set forth.

In the practice of our improved process, as above described, we are able to achieve more perfect curing of the rubber, balata, or like material, with a minimum of curing ingredients which include curing agents, curing accelerators, and controlling ingredients. From the above, it will be seen that we have departed from the common practice now in vogue of using a minimum of 3% of zinc oxide, based on the rubber, balata, or the like, to obtain commercially satisfactory activation of the accelerator, since it is obvious from the very low proportions of zinc laurate which we employ, and with which we achieve highly satisfactory results, that much less than the equivalent of 3% of zinc oxide is actually required in our process, this being due, doubtless, to the fact that the zinc-bearing material is incorporated into the compositions in such a way that it is free to react immediately with other curing agents and not be under the necessity of becoming closely associated with them in the compound due to migration in the compound of the curing materials to each other, and more uniform and quicker curing should be obtained.

The same reasoning applies to all of the curing ingredients and aids that are used in rubber compounds.

Our solution method of incorporation of all of the vulcanizing ingredients and curing aids, closely pre-associated, permits of more uniform and probably more rapid vulcanization. It follows from this that such a process may provide very decided economies by reducing the amount of expensive curing materials necessary to produce vulcanization.

The present application is directed more particularly to the processing of golf ball covers or like articles of similar composition, presenting similar problems, with reservation for claiming divisible and other subject matter disclosed herein in applications to be later filed.

The above process is found to be equally applicable to the curing of rubber, preferably by suitably varying the proportions of ingredients employed, as will be obvious to those skilled in the art, with a considerable economy effected in the cost of required ingredients.

More particularly, however, our invention has a highly advantageous application to the curing of golf ball covers which may comprise a mixture of balata, gutta percha, rubber, or like materials, in any desired combination, whereby said covers, after being molded onto the ball cores, may be supplied with all necessary curing ingredients, including rubber penetrating vehicle, rubber solvent, curing agent, curing accelerator, and accelerator activator materials, and such a material as soluble bivalant metal salt or alkali metal salt. The salt in the above described embodiment of our invention is preferably introduced into solution through the application of zinc laurate as previously described.

In the claims herein we have referred to relatively low and relatively elevated temperatures, these having reference to the temperature of the solution which is applied to the ball covers for a relatively short period, as described, such temperature as previously pointed out, being preferably about 68° or 70°, the relatively elevated temperature having reference to the prolonged heating subsequent to treatment by the solution with contained ingredients, as described, and which subsequent elevated drying and/or curing temperature is preferably kept between 95° and 105°, although the present invention is not limited to the maintenance of the above mentioned specific range of temperatures, which may be widely varied, and more particularly when the stock to which the solution is applied is varied in composition from that hereinabove set forth as being preferably for the purpose set forth.

It will be understood, of course, that the process may be carried out at substantially lower temperatures for correspondingly longer periods, and vice versa, in accordance with well known principles relating to rubber chemistry and technology, and the claims herein unless specifically limited are to be given a scope in accordance with this understanding.

For other purposes than golf balls and in the manufacture of various types of golf balls, the proportions of ingredients as above set forth, and equivalents thereof, may be varied for any particular specific use thereof, within the purview of this invention.

Having thus described our invention, what we claim is:

1. In the method of treating golf ball covers, said cover composed predominantly of balata, the steps which comprise infusing a solution into the molded stock which is capable of penetrating the stock without softening or causing deformation thereof and which comprises a substantial amount of a dialkylammoniumdithiocarbamate and zinc dialkyldithiocarbamate in such proportions that the zinc salt is not present in greater molecular proportions than two to one.

2. In the method of treating golf ball covers, said covers composed predominantly of balata, the steps which comprise infusing a solution into the molded stock comprising a secondary aliphatic amine, an organic zinc salt such as zinc laurate, a sulphur containing substance capable of providing free sulphur and carbon disulphide.

3. In the method of treating golf ball covers, said covers composed predominantly of balata, infusing a solution into the stock comprising a sulphur containing substance capable of providing free sulphur and a secondary aliphatic amine, an organic zinc salt such as zinc laurate and carbon disulphide in such molecular proportions with respect to each other as to produce by reaction a substantial amount of a dialkylammonium dialkyldithiocarbamate and a substantial amount of a zinc dialkyldithiocarbamate.

4. In the manufacture of golf balls, the process of curing a cover for said balls, which cover comprises a mixture of rubber and balata, said mixture being free from any material capable of acting as an ingredient of an accelerator of vulcanization, which consists in subjecting said cover to a solution having the curing, penetrating and controlling effects substantially like that of the following solution:

| | Parts by volume |
|---|---|
| Benzol (benzene) cc | 25 |
| Carbon disulphide cc | 15 |
| Methanol cc | 60 |

| | Parts by weight |
|---|---|
| Zinc laurate grams | 1.8 |
| dibutyl xanthic disulphide do | 5.75 |
| Diamylamine do | 3 | at a moderate temperature, then drying the covered ball and curing the cover thereof by substantially elevating the temperature of said cover for a prolonged period of time.

5. The process of curing a completely formed golf ball cover comprising a mixture of balata or the like with rubber, and which completely molded mixture is free from any material capable of acting as an ingredient of an accelerator of vulcanization which comprises subjecting the said mixture to a solution containing a solvent, a non-solvent, a zinc laurate metal salt, a polysulphide accelerator, and an amine, at a temperature of not more than 70 degrees Fahrenheit, removing the mixture from said solution and subjecting the said mixture to a temperature of substantially more than 70 degrees Fahrenheit to complete effective curing.

6. In the method of treating golf ball covers, said covers composed predominantly of balata, infusing a solution into the stock comprising a sulphur containing substance capable of providing free sulphur, carbon disulphide, and a substantial amount of dialkylammoniumdialkyldithiocarbamate and zinc dialkyodithiocarbamate in which the alkyl group is an aliphatic radical.

7. In the method of treating golf ball covers, said covers composed predominantly of balata, treating the stock with a solution providing fast penetration of the stock without causing softening or deformation thereof and which comprises a sulphur containing substance capable of providing free sulphur, and carbon disulphide, an organic zinc salt such as zinc laurate and an aliphatic secondary amine in such molecular proportions that a substantial amount of a dialkylammoniumdithiocarbamate and a substantial amount of zinc dialkyldithiocarbamate are formed but in which the zinc dialkyldithiocarbamate is present in an amount less than 2 to 1 with respect to the dialkylammoniumdithiocarbamate.

8. In the method of treating golf ball half covers, said covers composed predominantly of balata, infusing a solution into the stock, said solution being capable of penetrating the stock without softening or causing deformation thereof, and which comprises a sulphur containing substance capable of providing free sulphur, a secondary aliphatic amine, an organic zinc salt such as zinc laurate and carbon disulphide in such proportions as to produce a substantial amount of a dialkylammoniumdithiocarbamate and a substantial amount of a zinc dialkyldithiocarbamate, and then curing the stock.

9. The method of treating golf balls, said balls being composed of stock containing balata, infusing a solution into the stock, said solution being capable of penetrating the stock without causing deformation or softening thereof and which comprises a sulphur containing substance capable of providing free sulphur, carbon disulphide and a substantial amount of a dialkylammoniumdialkydithiocarbamate and zinc dialkyldithiocarbamate in which the alkyl groups are of the aliphatic type and in which the zinc dialkyldithiocarbamate is not present in greater molecular proportions with respect to the dialkylammoniumdithiocarbamate than 2 to 1, and then curing the stock.

10. The method of treating golf balls, said balls being formed free from vulcanizing ingredients and composed principally of balata with an inert pigment, said solution being infusing a solution into the stock which is capable of penetrating the stock without causing deformation or softening thereof and which comprises a sulphur containing substance capable of providing free sulphur, carbon disulphide and a substantial amount of a dialkyammoniumdialkydithiocarbamate and zinc dialkyldithiocarbamate and in which the zinc dialkyldithiocarbamate salt is not present in greater molecular proportions with respect to the dialkylammonium salt than two to one, and then curing the stock.

11. In the method of treating golf ball covers, the stock for said covers being composed predominantly of balata, infusing a solution into the stock comprising a sulphur containing substance capable of providing free sulphur, carbon disulphide, and a substantial amount of diamylammoniumdiamyldithiocarbamate and zinc diamyldithiocarbamate, and then curing the stock.

12. The process of curing a golf ball cover, comprising a mixture of balata, rubber, compounded with a coloring ingredient, but free from any curing agent, accelerator, or ingredient, in situ, consisting of the preparation of a solution comprising an activator containing the metallic element zinc in chemical combination with other elements, whereby the metallic element may enter into a solution with a rubber penetrant and a suitable curing accelerator, then immersing the completed golf balls having such covers into the solution whereby said solution penetrates the rubber, balata, or the like, to activate in situ said accelerator to effect curing.

13. The process of curing a golf ball cover by immersing the covered golf ball into a combined solution of two different solutions, the first by adding carbon disulphide to benzine, and then adding the resultant mixture to methanol, and then preparing another solution by dissolving zinc laurate in diamylamine or other high boiling point amine, at a substantially elevated temperature, then cooling the zinc laurate-amine solution to substantially room temperature and adding the cooled solution to the other carbon disulphide-benzine-methanol mixture, and removing the balls therefrom.

14. The process of curing a golf ball cover by immersing the covered golf ball into a combined solution of two different solutions, the first by adding carbon disulphide to benzine, and then adding the resultant mixture to methanol, and then preparing another solution by dissolving zinc laurate in diamylamine, at a substantially elevated temperature, then cooling the zinc laurate-amine solution to substantially room temperature and adding the cooled solution to the other carbon disulphide-benzine-methanol mixture, adding to the combined solution a quantity of dibutyl xanthic disulphide, removing the balls therefrom.

15. The process of curing a golf ball cover by immersing the covered golf ball into a combined solution of two different solutions, the first by adding carbon disulphide to benzine, and then adding the resultant mixture to methanol, and then preparing another solution by dissolving zinc laurate in diamylamine, at a substantially elevated temperature, then cooling the zinc laurate-amine solution to substantially room temperature and adding the cooled solution to the other carbon disulphide-benzine-methanol mixture, and removing the balls therefrom and then subjecting the covered balls to a relatively moderately elevated temperature of the order of 120° F.

16. The process of curing a golf ball cover by immersing the covered golf ball into a combined solution of two different solutions, the first by adding carbon disulphide to benzine, and then adding the resultant mixture to methanol, and then preparing another solution by dissolving zinc laurate in diamylamine, at a substantially elevated temperature, then cooling the zinc laurate-amine solution to substantially room temperature and adding the cooled solution to the other carbon disulphide-benzine-methanol mixture, adding to the combined solution a quantity of dibutyl xanthic disulphide, removing the balls therefrom, and then subjecting the covered balls to a relatively moderately elevated temperature of the order of 120° F.

ROBERT R. OLIN.
HOWARD I. CRAMER.
WILLIS E. REICHARD.